United States Patent
Won et al.

(10) Patent No.: US 9,424,783 B2
(45) Date of Patent: Aug. 23, 2016

(54) DISPLAY DEVICE OPTIMIZED FOR A HUMAN CIRCADIAN RHYTHM

(71) Applicant: SAMSUNG DISPLAY CO., LTD., Yongin, Gyeonggi-Do (KR)

(72) Inventors: Byeong-Hee Won, Hwaseong-si (KR); WonSang Park, Yongin-si (KR); Mingyeong Jo, Busan (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 193 days.

(21) Appl. No.: 14/463,208

(22) Filed: Aug. 19, 2014

(65) Prior Publication Data

US 2015/0227002 A1 Aug. 13, 2015

(30) Foreign Application Priority Data

Feb. 7, 2014 (KR) .......................... 10-2014-0014261

(51) Int. Cl.
*F21V 15/00* (2015.01)
*G09G 3/34* (2006.01)
*G02F 1/1335* (2006.01)

(52) U.S. Cl.
CPC ........... *G09G 3/34* (2013.01); *G02F 1/133603* (2013.01); *G09G 3/3413* (2013.01); *G02F 2001/133622* (2013.01); *G02F 2001/133624* (2013.01); *G02F 2201/52* (2013.01); *G09G2300/0452* (2013.01); *G09G 2310/0235* (2013.01)

(58) Field of Classification Search
CPC ................... G02F 1/133602; G02F 1/133621; G02F 1/133514; G02F 1/13306; G02F 1/134309; G02F 2001/134345; G02F 2001/133613

USPC ...................... 349/62; 362/612, 613; 345/112
See application file for complete search history.

(56) References Cited

U.S. PATENT DOCUMENTS

| 8,125,137 B2 * | 2/2012 | Medendorp, Jr. .... C09K 11/586 313/501 |
| 2011/0037081 A1 * | 2/2011 | Kuo .................... H01L 25/0753 257/89 |

(Continued)

FOREIGN PATENT DOCUMENTS

| KR | 1020080002301 | 1/2008 |
| KR | 100839022 | 6/2008 |
| KR | 1020080105874 | 12/2008 |

(Continued)

OTHER PUBLICATIONS

Understanding How Wavelengths Affect Circadian Rhythms, Specific wavelengths shift circadian rhythms while others may be counter productive. Apollo Health; The Power of Blue Wave Technology.

*Primary Examiner* — Hoan C Nguyen
(74) *Attorney, Agent, or Firm* — F. Chau & Associates, LLC

(57) ABSTRACT

Provided is a display device. The display device includes a display panel and first to third light source units. The display panel includes a plurality of pixels. The first to third light source units are disposed on a rear of the display panel. The first light source unit emits yellow light. The second light source unit emits a first blue light in a first wavelength band. The third light source unit emits a second blue light in a second wavelength band. The second wavelength band includes light of a longer wavelength than light of the first wavelength band. The first wavelength band ranges from about 430 nm to about 455 nm. The second wavelength band may ranges from about 460 nm to about 505 nm.

16 Claims, 21 Drawing Sheets

(56) References Cited

U.S. PATENT DOCUMENTS

2012/0245658 A1 9/2012 Pan et al.
2014/0246990 A1* 9/2014 Kim .................. H05B 33/0866
                                              315/250

FOREIGN PATENT DOCUMENTS

| KR | 1020140096877 | 8/2014 |
| KR | 1020140113046 | 9/2014 |

* cited by examiner

< 1-Field >

< 2-Field >

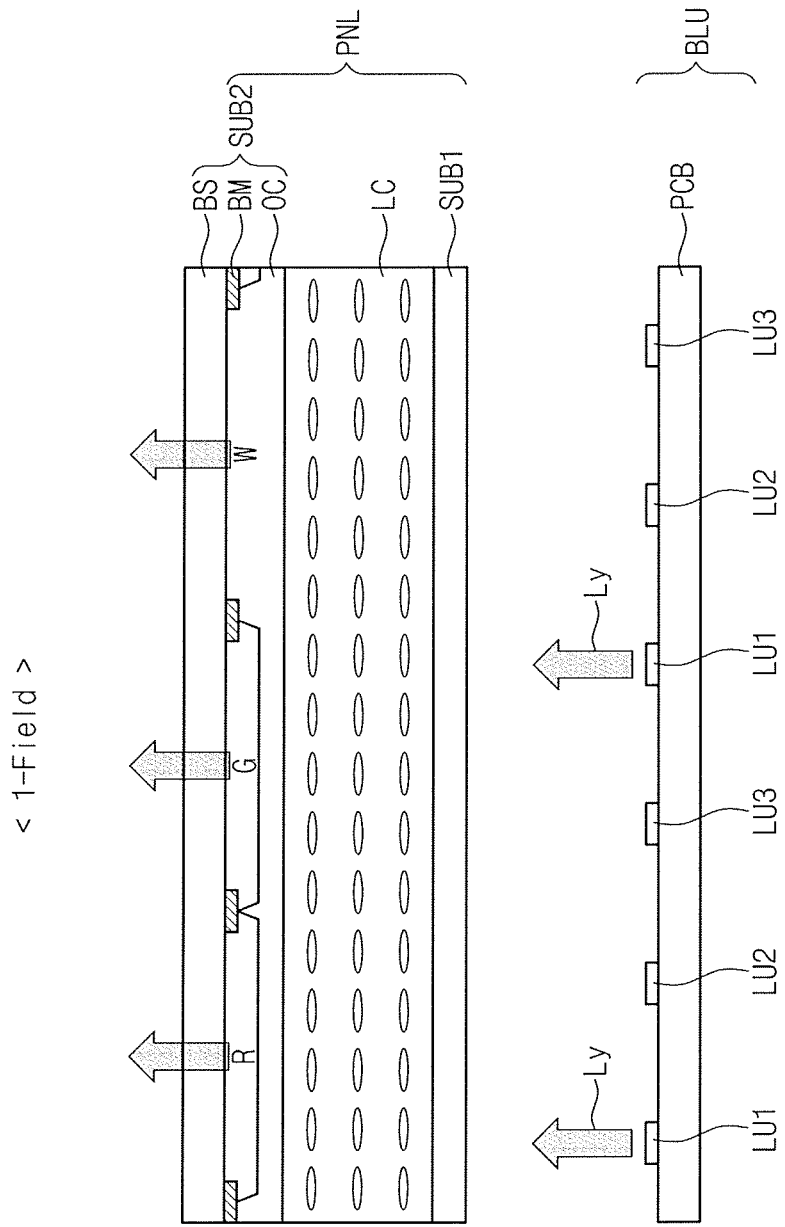

< 2-Field >

< 1-Field >

< 2-Field >

< 1-Field >

< 2-Field >

< 2-Field >

DISPLAY DEVICE OPTIMIZED FOR A HUMAN CIRCADIAN RHYTHM

CROSS-REFERENCE TO RELATED APPLICATIONS

This patent application claims priority under 35 U.S.C. §119 to Korean Patent Application No. 10-2014-0014261, filed on Feb. 7, 2014, in the Korean Intellectual Property Office, the disclosure of which is incorporated by reference herein in its entirety.

TECHNICAL FIELD

The present disclosure herein relates to a display device, and more particularly, to a display device optimized for a human circadian rhythm.

DISCUSSION OF THE RELATED ART

Display devices may either use a space division or a time division to combine primary colors to obtain a desired color for display.

A display device using the space division may include red, green, and blue color filters which may be arranged correspond to each sub pixel of a display panel of the display device. Here, a full color implementation may be achieved by transmittance differences between sub pixels of the display panel and combinations of the color through the red, green, and blue color filters.

In display devices using time division, a color filter may be omitted in the display panel, and instead light sources for emitting red, green, and blue light may be disposed at a rear part of the display panel. A unit frame is divided into three fields that are separated in time and a red, green, and blue light source is turned on for each field so that red, green, and blue color images are realized sequentially. Therefore, an observer may recognize a full color image by perceiving red, green, and blue color images combined with one another.

SUMMARY

According to an embodiment of the present inventive concept, a display device is provided. The display device includes a display panel and first to third light source units. The display panel includes a plurality of pixels. The first to third light source units are disposed on a rear of the display panel. The first light source unit is configured to emit yellow light. The second light source unit is configured to emit a first blue light in a first wavelength. The third light source unit is configured to emit a second blue light in a second wavelength band. The second wavelength band includes light of a longer wavelength than light of the first wavelength band. The first wavelength band ranges from about 430 nm to about 455 nm. The second wavelength band may ranges from about 460 nm to about 505 nm.

In an embodiment of the present inventive concept, a first pixel of the plurality of pixels may include a first color filter, a second color filter, and an open part. The second color filter may have a different color from that of the first color filter.

Neither the first color filter nor the second color filters is formed in the open part.

In an embodiment of the present inventive concept, the first and second color filters may be a red color filter and a green color filter, respectively.

In an embodiment of the present inventive concept, the display panel may be configured to display an image in a frame. The frame may include a first sub-field and a second sub-field. The first light source unit may be turned on and the second and third light source units may be turned off during the first sub-field. At least one of the second light source unit and the third light source unit may be turned on and the first light source unit may be turned off during the second sub-field.

In an embodiment of the present inventive concept, the yellow light may include a red light component and a green light component.

In an embodiment of the present inventive concept, an intensity of the first blue light of the second light source unit and an intensity of the second blue light of the third light source unit may be different from each other in a frame.

In an embodiment of the present inventive concept, the second light source unit and the third light source unit may be driven individually.

In an embodiment of the present inventive concept, the second light source unit and the third light source unit may be alternately driven for each frame.

In an embodiment of the present inventive concept, a first pixel may include first, second, and third sub pixels corresponding to the first color filter, the second color filter, and the open part, respectively. The first to third sub pixels may be driven separately.

In an embodiment of the present inventive concept, the first to third sub pixels may be turned on during the first sub-field. The third sub pixel may be turned on and the first and second sub pixels may be turned off during the second sub-field.

In an embodiment of the present inventive concept, the yellow light may pass through the first color filter, the second color filter, and the open part during the first sub-field. At least one of the first blue light and the second blue light may pass through the open part and might not pass through the first color filter and the second color filter during the second sub-field.

In an embodiment of the present inventive concept, the first and second color filters may be adjacent to each other in a first direction. The open part may be adjacent to one of the first and second color filters in the first direction.

In an embodiment of the present inventive concept, the first color filter and the second color filter may be spaced apart from each other in a first direction. The open part may include a first open part and a second open part. The first open part may be arranged between the first and second color filters in the first direction. The second open part may be arranged between the first pixel and a second pixel adjacent to the first pixel in the first direction among the plurality of pixels.

In an embodiment of the present inventive concept, a width of each of the first and second open parts may be less than a width of each of the first and second color filters.

In an embodiment of the present inventive concept, the display panel may be configured to display an image of a frame. The frame may include first to third sub-fields. The first light source unit may be turned on and the second and third light source units may be turned off during the first sub-field. The second light source unit may be turned on and the first and third light source units may be turned off during the second sub-field. The third light source unit may be turned on and the first and second light source units may be turned off during the third sub-field.

In an embodiment of the present inventive concept, the yellow light may pass through the first color filter, the second color filter, the first open part, and the second open part during the first sub-field. The first blue light may pass through the first open part and might not pass through the first color filter, the second color filter, and the second open part during the second sub-field. The second blue light may pass through the second open part and might not pass through the first color filter, the second color filter, and the first open part during the third sub-field.

BRIEF DESCRIPTION OF THE DRAWINGS

A more complete appreciation of the present inventive concept and many of the attendant aspects will be readily obtained as the same becomes better understood by reference to the following detailed description when considered in connection with the accompanying drawings, wherein:

FIG. 4A is a sectional view taken along a line I-I' of FIG. 3A

DETAILED DESCRIPTION OF THE EMBODIMENTS

Figure 1:
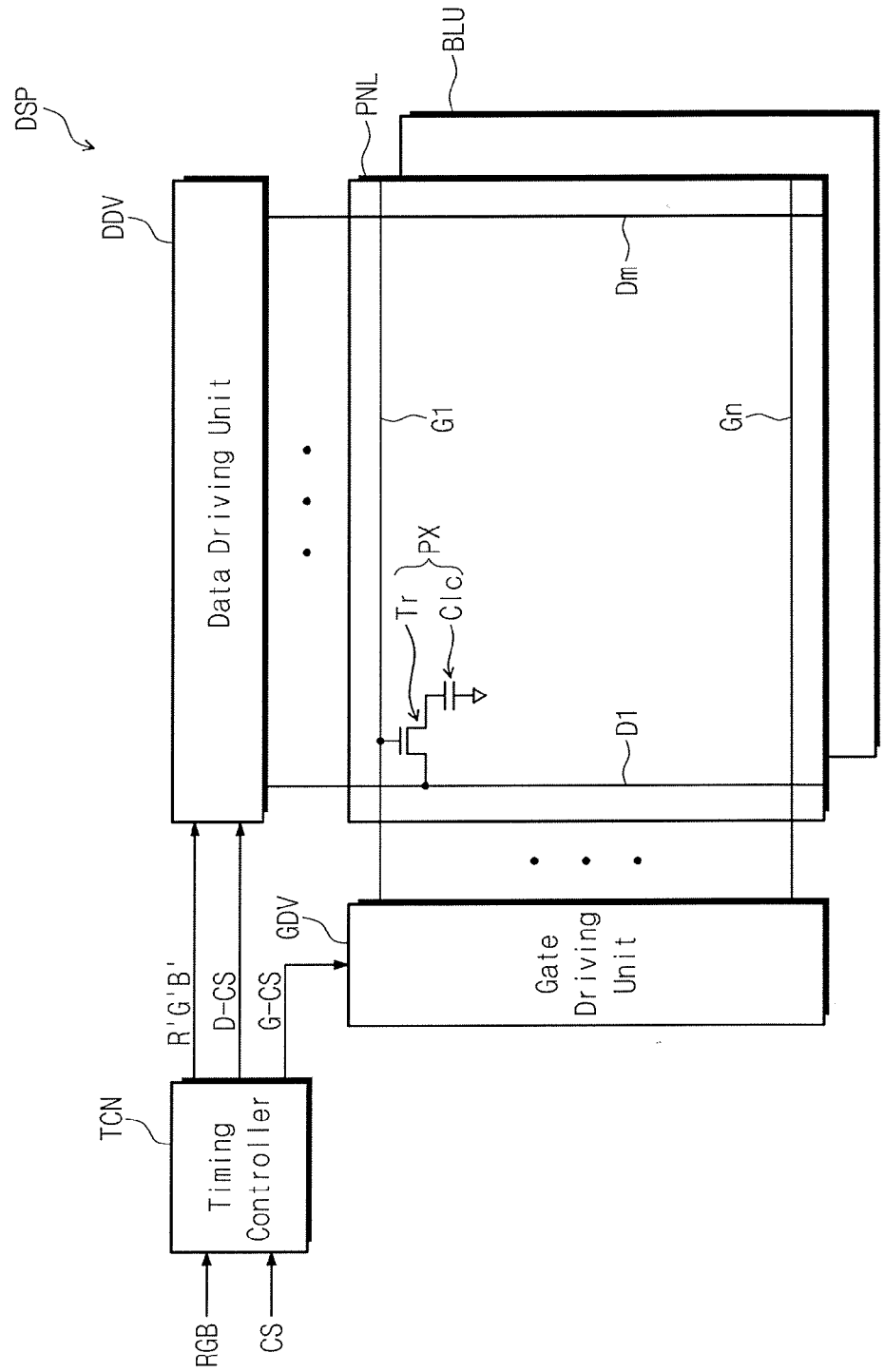
FIG. 1 is a block diagram illustrating a display device according to an embodiment of the present inventive concept.

Hereinafter, exemplary embodiments of the present inventive concept will be described in more detail with reference to the accompanying drawings.

Each figure may be partly simplified or exaggerated for clarity of illustration. Like reference numerals may refer to like elements throughout the specification and drawings FIG. 1 is a block diagram illustrating a display device according to an embodiment of the present inventive concept.

Referring to FIG. 1, the display device DSP includes a display panel PNL for displaying an image, a gate driving unit GDV and a data driving unit DDV for driving the display panel PNL, and a timing controller TCN for controlling the driving of the gate driving unit GDV and the data driving unit DDV.

The display panel may be a light-receiving type display panel and a liquid crystal display panel is used as an example of the light-receiving type display panel. However, the display panel is not limited thereto. For example, the display panel may include a liquid crystal display panel, an electrophoretic display panel, an electrowetting display panel, a MEMS display panel, etc.

The display panel PNL includes a plurality of gate lines G1 to Gn, a plurality of data lines D1 to Dm, and a plurality of pixels PX. Each of the plurality of gate lines G1 to Gn extends in a row direction and is arranged to be parallel to each other in a column direction. Each of the plurality of data lines D1 to Dm extends in a column direction and is arranged to be parallel to each other in a row direction.

Each of the plurality of pixels PX includes a thin film transistor Tr and a liquid crystal capacitor C1c. For example, a pixel PX connected to a first gate line G1 and a first data line D1 includes a thin film transistor Tr and a liquid crystal capacitor C1c.

The thin film transistor Tr includes a gate electrode connected to the first gate line G1, a source electrode connected to the first data line D1, and a drain electrode connected to the liquid crystal capacitor C1c.

The timing controller TCN receives a plurality of image signals RGB and a plurality of control signals CS from the outside of the display device DSP. The timing controller TCN converts a data format of the image signals RGB to conform to the specification of an interface with the data driving unit DDV and provides the converted image signals R'G'B' to the data driving unit DDV. In addition, the timing controller TCN generates a data control signal D-CS (for example, an output start signal and a parallel start signal) and a gate control signal G-CS (for example, a vertical start signal, a vertical clock signal, and a vertical clock bar signal). The data control signal D-CS is provided to the data driving unit DDV and the gate control signal G-CS is provided to the gate driving unit GDV.

The gate driving unit GDV outputs gate signals sequentially in response to the gate control signal G-CS provided from the timing controller TCN. Accordingly, the plurality of pixels PX may be scanned sequentially row-by-row according to the gate signals.

The gate driving unit DDV converts the image signals R'G'B' into data voltages and outputs the converted data voltages in response to the data control signal D-CS provided from the timing controller TCN. The outputted data voltages are applied to the display panel PNL.

Accordingly, each pixel PX is turned on by the gate signal and the turned on pixel PX receives a corresponding data voltage from the data driving unit DDV to display a desired grayscale image.

As shown in FIG. 1, the display device DSP further includes a backlight unit BLU at the rear of the display panel PNL. The backlight unit BLU supplies light from the rear of the display panel PNL. According to an embodiment of the present inventive concept, the backlight unit BLU may employ a plurality of light emitting diodes (not shown) as a light source. In addition, the plurality of light emitting diodes may be arranged in a stripe form along a direction or a matrix form on a printed circuit substrate.

Figure 2:
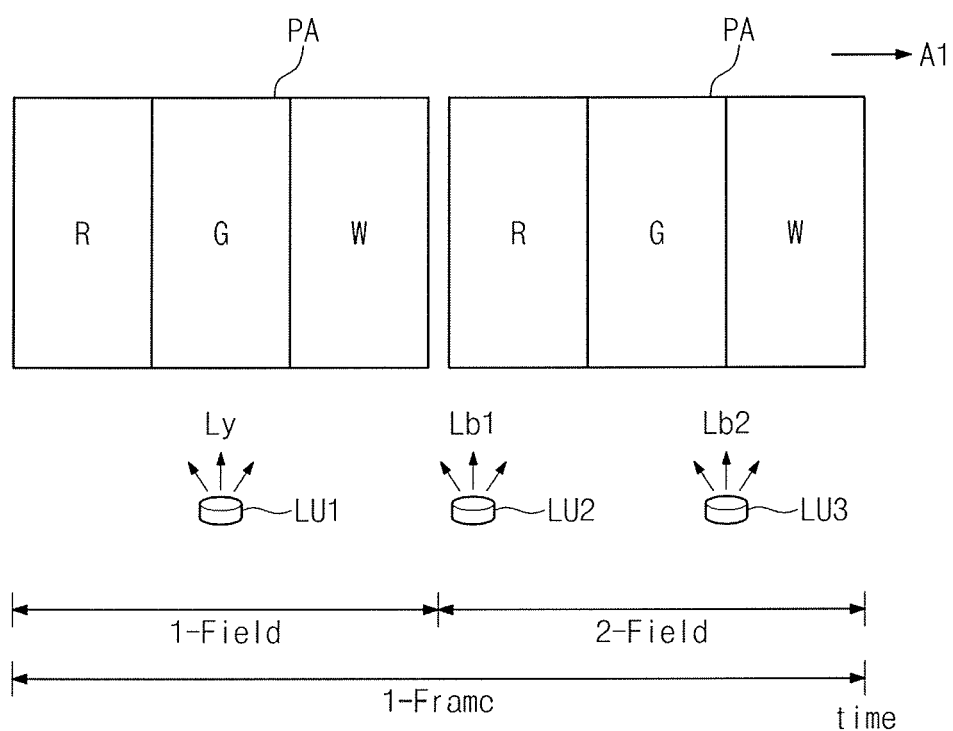
FIG. 2 is a diagram illustrating a full-color implementation principle by a time/space division type.

FIG. 2 is a diagram illustrating a full-color implementation principle by a time/space division type.

Referring to FIG. 2, the time/space division type includes first and second color filters having different colors in the display panel PNL of FIG. 1 for full color implementation. According to an embodiment of the present inventive concept, the first and second color filters may be a red color filter R having a red color and a green color filter G having a green color, respectively. When an area corresponding to one pixel is defined as a pixel area PA, the red and green color filters R and G are provided in each pixel area PA. In addition, an open part W is formed in an area where neither the first color filter nor the second color filter G is formed in each pixel area PA. The open part W may be formed at one side of one of the red and green color filters R and G. The red color filter R, the green color filter G, and the open part W may be arranged in one direction A1. However, the present inventive concept is not limited thereto. For example, the red color filter R, the green color filter G, and the open part W may be arranged in a different order from the order shown in FIG. 2 or may be arranged along a different direction.

In addition, the backlight unit BLU of FIG. 1 includes a first light source unit LU1 for generating yellow light Ly, a second light source unit LU2 for generating first blue light Lb1, and a third light source unit LU3 for generating second blue light Lb2.

Referring back to FIG. 2, a unit frame 1-Frame is divided into first and second sub-fields 1-Field and 2-Field according to a temporal order. The first light source unit LU1 is driven in an interval of the first sub-field 1-Field and thus, the yellow light Ly is outputted from the backlight unit BLU and is provided to the display panel PNL. In addition, at least one of the second light source unit LU2 and the third light source unit LU3 is driven in an interval of the second sub-field 2-Field and thus, at least one of the first blue light Lb1 and the second blue light Lb2 is outputted from the backlight unit BLU and is provided to the display panel PNL. For example, all the first blue light Lb1 and the second blue light Lb2 may be outputted, respectively from the second light source unit LU2 and the third light source unit LU3 during the second sub-field 2-Field. This is illustrated as one example.

According to an embodiment of the present inventive concept, the yellow light Ly may include light of wavelength bands corresponding to a red light component and a green light component in addition to the light of a wavelength band corresponding to a yellow light component. For example, the wavelength band of the yellow light Ly may include the wavelength band corresponding to the red light and the wavelength band corresponding to the green light. In an embodiment of the present inventive concept, a wavelength band of light is a range of a wavelength where a peak is located in each light's spectrum.

Accordingly, during an interval of the first sub-field 1-Field, a red light component in the yellow light Ly generated from the backlight unit BLU penetrates the red color filter R and is displayed as a red image, and a green light component in the yellow light Ly penetrates the green color filter G and is displayed as a green image.

During an interval of the second sub-field 2-Field, the first blue light Lb1 and the second blue light Lb2 generated from the backlight unit BLU pass through the open part W and are displayed as a blue image.

The first blue light Lb1 and the second blue light Lb2 have different wavelength bands from each other and each represent a blue color. When the wavelength band of the first blue light Lb1 is referred to as a first wavelength band and the wavelength band of the second blue light Lb2 is referred to as a second wavelength band, the first wavelength band may have light of longer wavelength than the second wavelength band.

For example, each wavelength band may include light of multiple wavelengths, however an average wavelength of the light of the first wavelength band is larger than an average wavelength of the light of the second wavelength band.

For example, each wavelength band may include light of various different wavelengths that are all within a common range and the range for the first wavelength band starts at a longer wavelength than the second wavelength band, and/or the range for the first wavelength band ends at a longer wavelength than the second wavelength band.

According to an embodiment of the present inventive concept, the first wavelength band ranges, for example, from about 460 nm to about 505 nm and the second wavelength band ranges, for example, from about 430 nm to about 455 nm.

In an embodiment of the present inventive concept, the open part W is provided for a space where a blue image is displayed during an interval of the second sub-field 2-Field. In addition, the open part W may eliminate a color separation phenomenon that may occur in a time division type display device and may increase brightness, and thus a size of the open part W may be determined to provide an appropriate transmittance in consideration of a desired brightness or color of a frame.

Figure 3A:
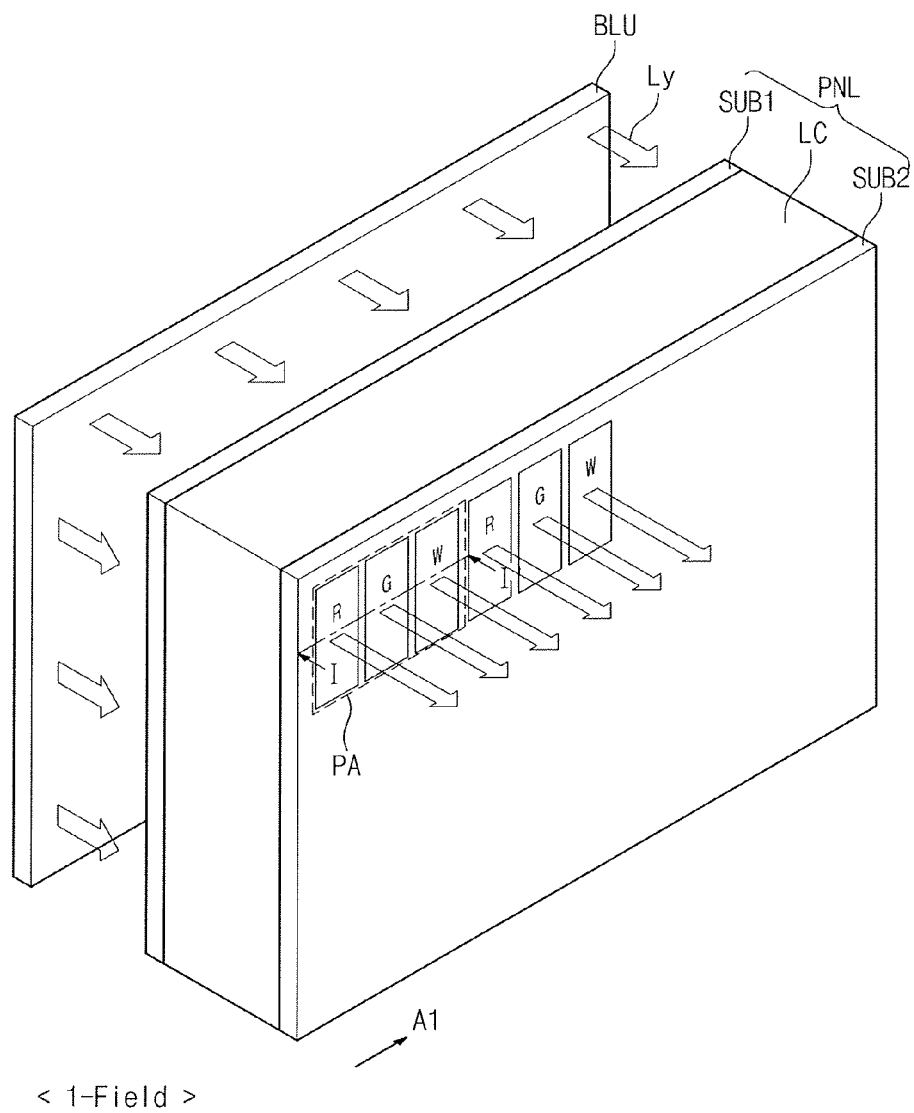
FIGS. 3A and 3B are exploded perspective views illustrating a full color implementation principle by a time/space division type in the display device of FIG. 2.
Figure 3B:
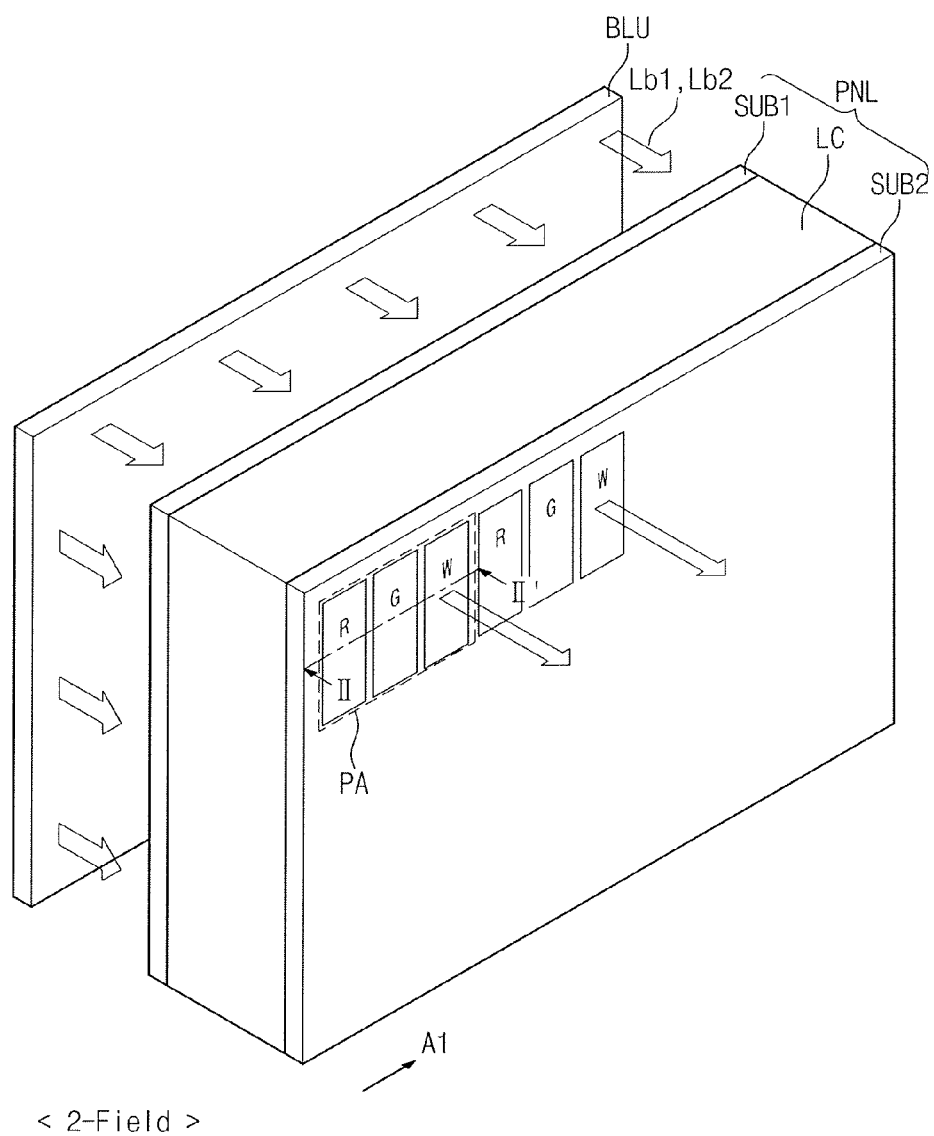
Figure 4B:
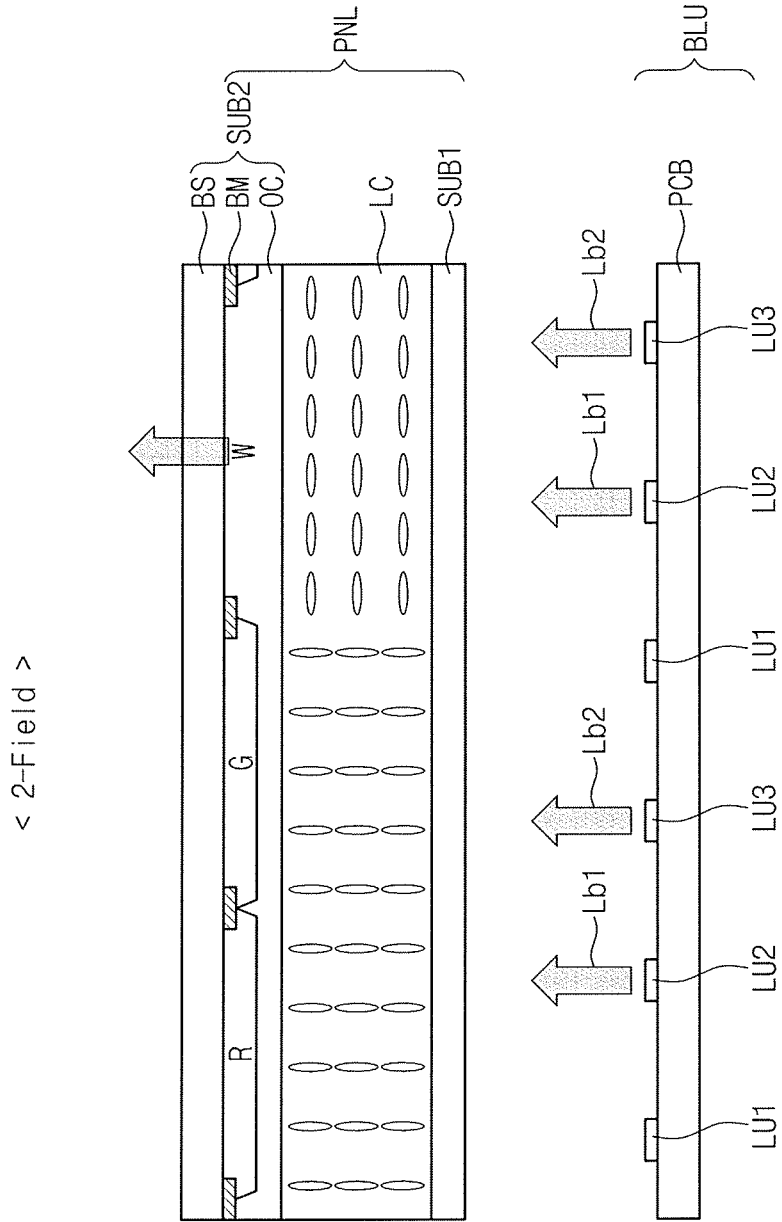
FIG. 4B is a sectional view taken along a line II-II' of FIG. 3B.

FIGS. 3A and 3B are exploded perspective views illustrating a full color implementation principle by a time/space division type in the display device of FIG. 2. FIG. 4A is a sectional view taken along a line I-I' of FIG. 3A and FIG. 4B is a sectional view taken along a line II-II' of FIG. 3B. In addition, FIGS. 3A and 4A illustrate an operation mode of a first sub-field in a unit frame and FIGS. 3B and 4B illustrate an operation mode of a second sub-field in a unit frame.

Operation modes of the display panel PNL and the backlight unit BLU change in the first and second sub-fields 1-Field and 2-Field, and structures of the display panel PNL and the backlight unit BLU do not change. Accordingly, hereinafter, referring to FIGS. 3A and 4A, structures of the display panel PNL and the backlight unit BLU will be described first.

Referring to FIGS. 3A and 4A, the display panel PNL may have a structure in which the red and green color filters R and G are arranged repeatedly in a first direction A1.

For example, the display panel PNL includes a first substrate SUB1, a second substrate SUB2 parallel to the first substrate SUB1, and a liquid crystal layer LC interposed between the first substrate SUB1 and the second substrate SUB2.

Although not shown in the drawing, the first substrate SUB1 may be a lower substrate including the thin transistor Tr of each pixel PX of FIG. 1 and a first electrode (e.g., a pixel electrode) of a liquid crystal capacitor C1c (not shown). The second substrate SUB2 may be an upper substrate including at least two color filters R and G in each pixel area PA and a second electrode (e.g., a reference electrode) of the liquid crystal capacitor C1c. For convenience of description, as shown in FIG. 4A, pixels in the first substrate SUB1 and the reference electrode in the second substrate SUB2 are omitted.

Referring to FIG. 4A, the second substrate SUB2 includes a base substrate BS, red and green color filters R and G on the base substrate BS, a black matrix BM formed along the edge of the red and green color filters R and G, and an over coating layer OC covering the red and green color filters R and G and the black matrix BM.

An open part W including neither the red color filter R nor the green color filter G is provided at one side of one of the red and green color filters R and G in the base substrate BS.

Although not shown in the drawing, each pixel PX may include a red sub pixel corresponding to the red color filter R, a green sub pixel corresponding to the green color filter G, and a white sub pixel corresponding to the open part W. In an embodiment of the present inventive concept, since the white sub pixel transmits all the light passing through the open part W, it is referred to as a white sub pixel for convenience and does not necessarily represent a white color. Each of the red, green, and white sub pixels includes a thin film transistor and a liquid crystal capacitor to be driven separately.

The over coating layer OC includes an organic insulating layer to cover the red and green color filters R and G and the open part W. The over coating layer OC may reduce a difference in level between an area where each color filter (e.g., red color filter R or green color filter G) is formed and an area where the open part W is formed.

In addition, the backlight unit BLU includes a first light source unit LU1, a second light source unit LU2, and a printed circuit board PCB where the first and second light source units LU1 and LU2 are mounted. Although, a structure in which the first to third light source units LU1, LU2, and LU3 are arranged alternately on the printed circuit board PCB is illustrated in FIGS. 4A and 4B, but the present inventive concept is not limited thereto.

The first light source unit LU1 outputs yellow light Ly, the second light source unit LU2 outputs first blue light Lb1, and the third light source unit LU3 outputs second blue light Lb2.

Referring to FIGS. 3A and 4A, during an interval of the first sub-field 1-Field, the first light source unit LU1 operates (e.g., turned on) to output the yellow light Ly, and the second light source unit LU2 and the third light source unit LU3 are turned off. In addition, during an interval of the first sub-field 1-Field, the red, green, and white sub pixels all operate. Accordingly, the yellow light Ly outputted from the first light source unit LU1 passes through the red and green color filters R and G and the open part W, and is displayed as an image.

Referring to FIGS. 3A and 4A, during an interval of the second sub-field 2-Field, the first light source unit LU1 is turned off, and the second light source unit LU2 and the third light source unit LU3 operate (e.g., turned on) to output the first blue light Lb1 and the second blue light Lb2. In addition, during an interval of the second sub-field 2-Field, the red and green sub pixels do not operate, and the white sub pixel operates. Accordingly, the first blue light Lb1 outputted from the second light source unit LU2 and the second blue light Lb2 outputted from the third light source unit LU3 do not pass through the red and green color filters R and G, and pass through the open part W to be displayed as a blue image.

A display device according to an embodiment of the present inventive concept implements a full color by a time/space division type, and thus display quality and response speed may be increased.

According to an embodiment of the present inventive concept, the first and second blue light (e.g., first blue light Lb1 or second blue light Lb2), when viewed by a viewer, may affect a level of melatonin produced by the viewer. For example, when the blue light has a wavelength band of about 464 nm, the production of melatonin may be suppressed. Melatonin is a hormone synthesized in the body and is synthesized from the pineal gland to be secreted into the blood. When a large amount of melatonin is synthesized in the body or melatonin is maintained for a long time, the melatonin may interfere with human circadian rhythm and/or contribute to reduced health (e.g., depression). These phenomenon have been documented in the Appollo Health's document on "Understanding How Wavelengths Affect Circadian Rhythms". According to an embodiment of the present inventive concept, in the case of the first blue light having the wavelength band of about 464 nm, the production of melatonin may be suppressed.

According to an embodiment of the present inventive concept, the melatonin inhibitory effect are clinically tested by using the blue light having the center wavelength of about 454 nm and the blue light having the center wavelength of about 464 nm. When the blue light having the center wavelength of about 464 nm is used, an amount of produced melatonin is reduced, as compared to the blue light having the center wavelength of about 454 nm. For example, the amount of produced melatonin of when the center wavelength of the blue light is about 464 nm is 0.71 times the amount of produced melatonin of when the center wavelength of the blue light is about 454 nm. In addition, with the same amount of light, a time at which an amount of melatonin in the body becomes 12.5 pg/mL by using the blue light having the center wavelength of about 454 nm and the blue light having the center wavelength of about 464 nm are measured. When the blue light having the center wavelength of about 464 nm is used, the time at which the melatonin becomes 12.5 pb/mL is delayed by about 3 hours and the maximum secretion corresponds to about the half, compared to the case of when the blue light having the center wavelength of about 454 nm is used.

According to an embodiment of the present inventive concept, a dim light melatonin onset (DLMO) of melatonin in the body is measured by using the same amount of the blue light having the center wavelengths of about 454 nm and about 464 nm. When the DLMO is measured on the basis of a threshold value corresponding to about 20% of the maximum amount of the produced melatonin value, as compared to the blue light having a center wavelength of about 454 nm, the DLMO is delayed by 46 minutes in the case of the blue light having the center wavelength of about 464 nm, compared to the case of the blue light having the center wavelength of about 454 nm. In addition, when the DLMO of melatonin is measured based on a threshold value corresponding to about 50% of the maximum amount of the produced melatonin value, the DLMO is delayed by 51 minutes, compared to the case of the blue light having the center wavelength of about 464 nm.

For example, an ultra-short wavelength blue light having a wavelength band of less than about 430 nm may be used. However, the present inventive concept is not limited thereto.

As mentioned above, when blue light having a relatively long center wavelength (e.g., 464 nm) is used, the production of melatonin may be suppressed. According to an embodiment of the present inventive concept, a wavelength band of blue light may be adjusted by selectively driving the second light source unit LU2 and the third light source unit LU3 for emitting the first blue light Lb1 or the second blue light Lb2, respectively and thus, the production (or suppression) of melatonin may be adjusted.

According to an embodiment of the present inventive concept, a wavelength band of blue light may be adjusted by individually driving the second light source unit LU2 and the third light source unit LU3 for emitting the first blue light Lb1 or the second blue light Lb2, respectively and thus, the production (or suppression) of melatonin may be adjusted.

According to an exemplary embodiment of the present inventive concept, an amount of first blue light Lb1 may be adjusted to implement a full color in the display device.

To this end, one or both of the second light source unit LU2 and the third light source unit LU3 may be driven. In addition, each of the first blue light Lb1 and the second blue light Lb2 may be set to have the same amount of light or different amounts of light. Whether to drive the second light source unit LU2 and the third light source unit LU3 may be automatically selected according to an order which is set in a display device, or may be arbitrarily selected without an order which is set in the display device, or may be selected by a user. Thus, according to an embodiment of the present inventive concept, the production (or suppression) of melatonin may be easily adjusted and accordingly, a display device optimized for a human circadian rhythm may be provided.

In addition, a display device according to an embodiment of the present inventive concept uses first blue light Lb1 and second blue light Lb2 having different wavelength bands to expand color coordinates and to control the color coordinates easily when an image is displayed.

Figure 5:
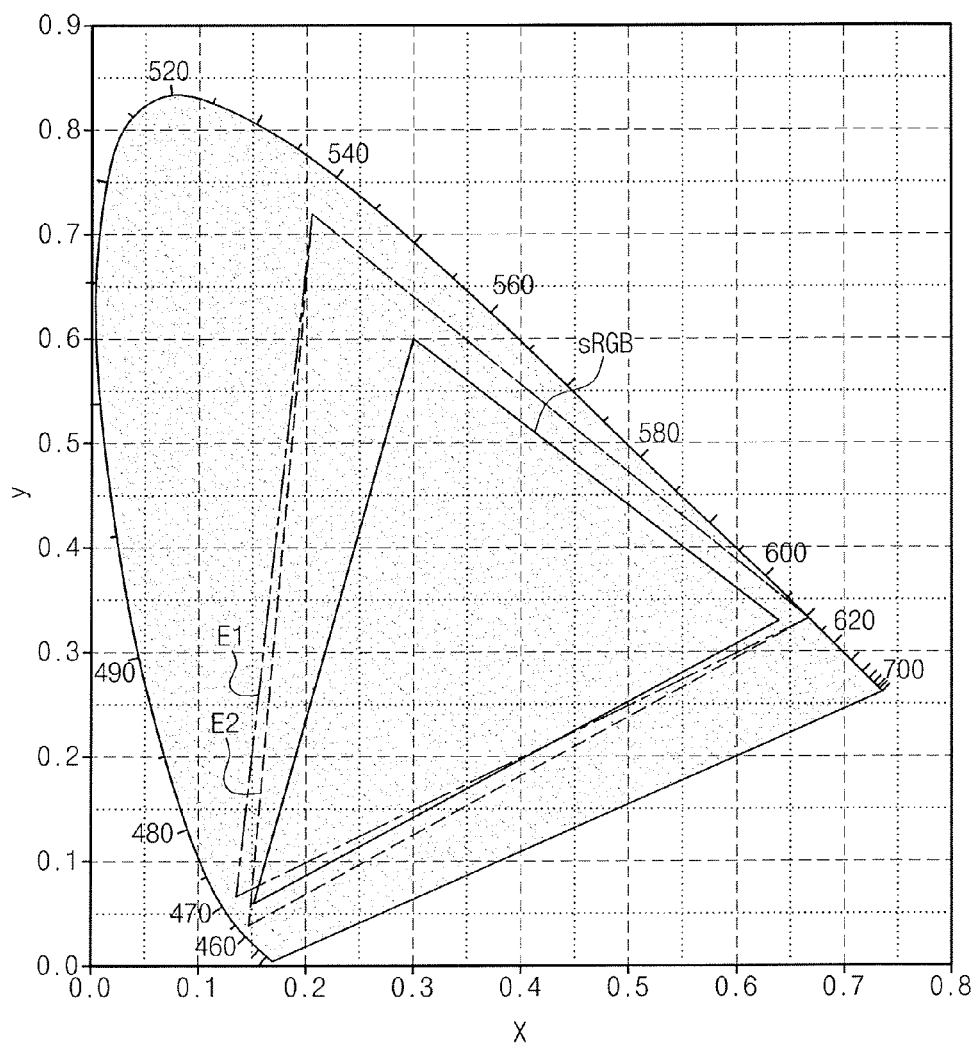
FIG. 5 is a view illustrating a color coordinate of a display device according to an embodiment of the present inventive concept.

FIG. 5 is a view illustrating a color coordinate of a display device according to an embodiment of the present inventive concept. Referring to FIG. 5, a color coordinate when the first blue light Lb1 is used is shown as E1 and a color coordinate when the second blue light Lb2 is used is shown as E2.

Table 1 shows x and y coordinates of the first blue light Lb1 and the second blue light Lb2.

TABLE 1

| Color coordinate | X | Y |
| --- | --- | --- |
| Reference | 0.141 | 0.048 |
| First blue light | 0.133 | 0.065 |
| Second blue light | 0.146 | 0.039 |

Referring to FIG. 5 and Table 1, since the first blue light Lb1 and the second blue light Lb2 have different color coordinates from each other, an area of color coordinates may be expanded by selectively or individually using the first blue light Lb1 and the second blue light Lb2.

Figure 6:
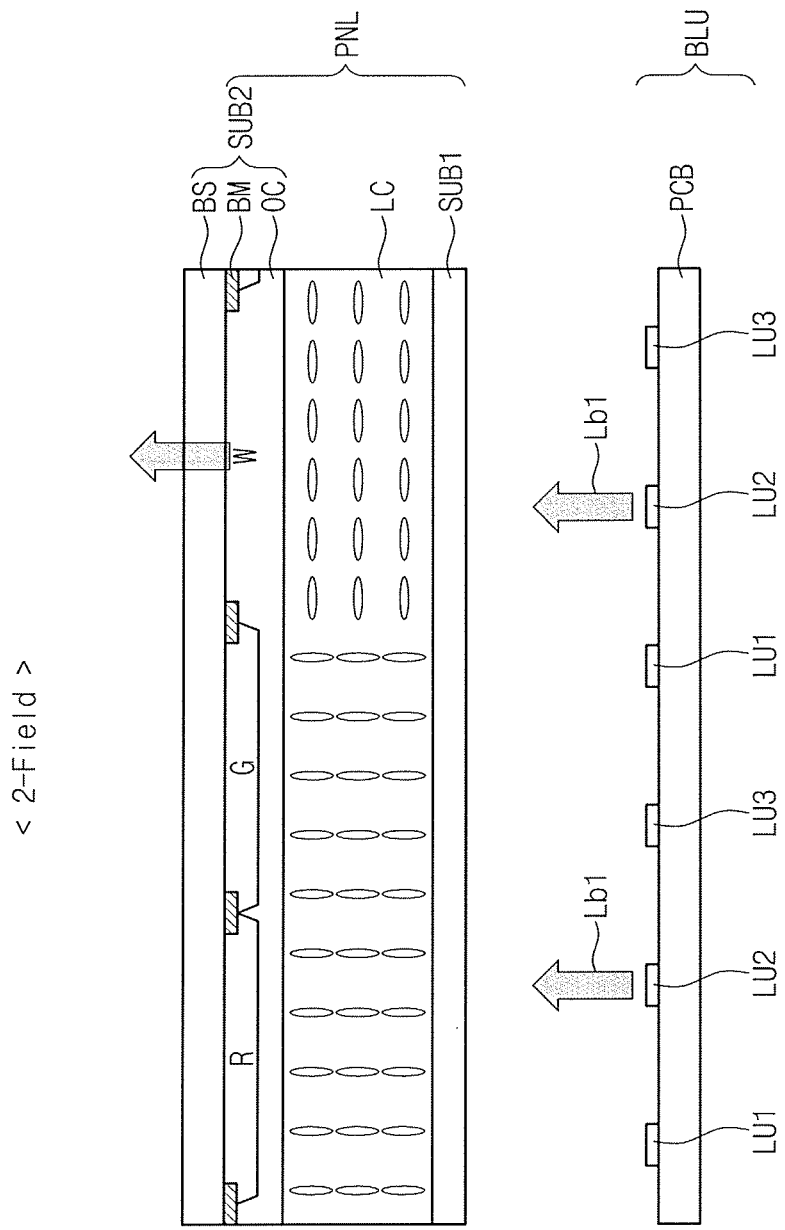
FIGS. 6 and 7 are sectional views illustrating an operation mode of a second sub-field in a unit frame according to an embodiment of the present inventive concept.
Figure 7:
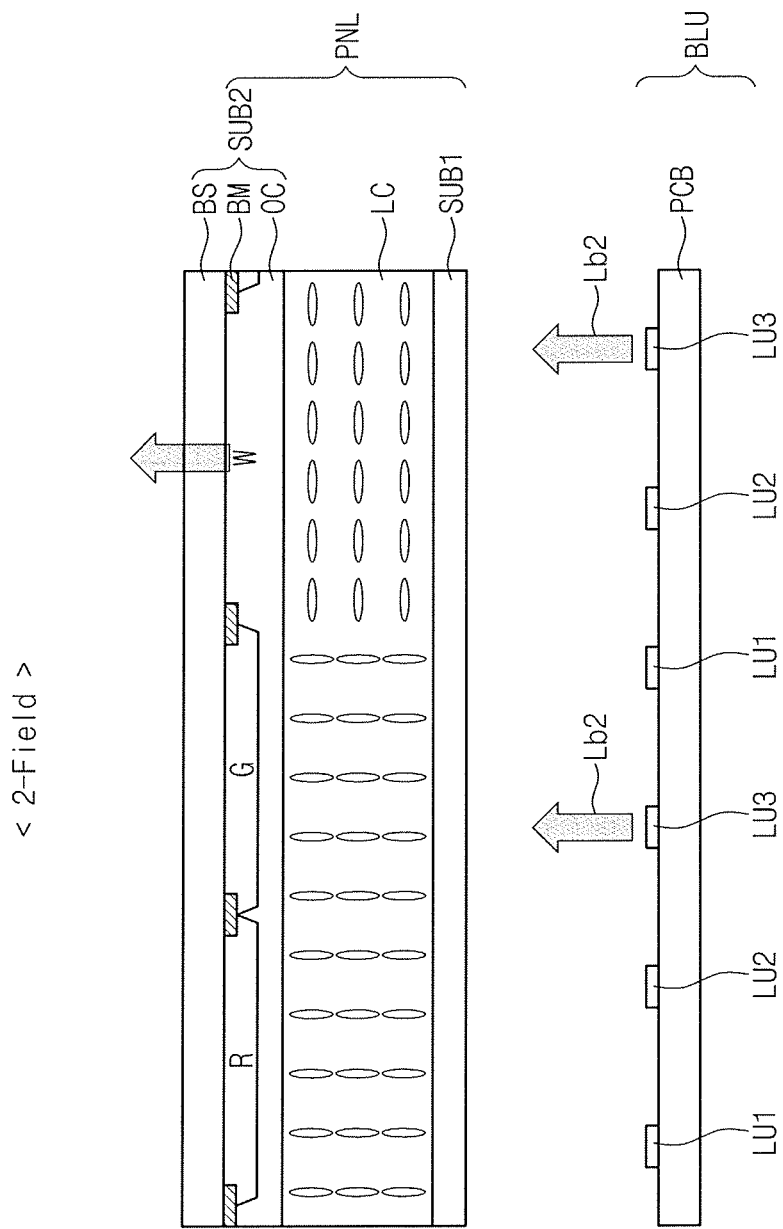

As mentioned above, the display device may selectively provide the first blue light Lb1 and the second blue light Lb2 to a display panel. FIGS. 6 and 7 are sectional views illustrating an operation mode of a second sub-field in a unit frame according to an embodiment of the present inventive concept. In embodiments of the present inventive concept with reference to FIGS. 6 and 7, since an operation mode of a first sub-field in a unit frame is identical to that in the above-mentioned embodiment, overlapping descriptions will be omitted.

Referring to FIG. 6, only the second light source unit LU2 is driven in the second sub-field according to an embodiment of the present inventive concept. The first and third light source units LU1 and LU3 might not be driven in the second sub-field. Referring to FIG. 7, only the third light source unit LU3 may be driven in the second sub-field. The first and second light source units LU1 and LU2 might not be driven in the second sub-field.

Figure 8:
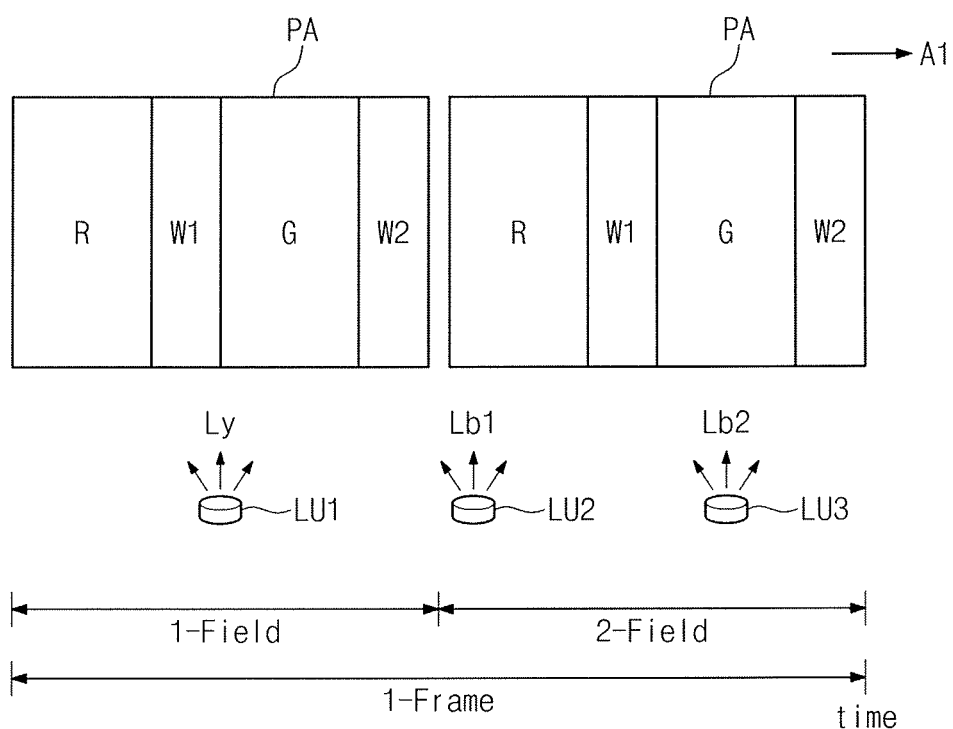
FIG. 8 is a diagram illustrating a full color implementation principle by a time/space division type according to an embodiment of the present inventive concept.

According to an embodiment of the present inventive concept, a pixel area of a display device may be provided by various methods. FIG. 8 is a diagram illustrating a full color implementation principle by a time/space division type according to an embodiment of the present inventive concept. Hereinafter, in describing a display device according to an embodiment of the present inventive concept, for convenience of description, only different structures from those in FIGS. 1 and 2 will be described and omitted portions may follow the descriptions of the embodiments with reference to FIGS. 1 and 2.

Referring to FIG. 8, when an area corresponding to one pixel PX is defined as a pixel area PA, each pixel area PA includes the red and green color filters R and G. In addition, first and second open parts W1 and W2 are formed in each pixel area PA. The first open part W1 is formed between the red and green color filters R and G, and the second open part W2 is formed at one side of either the red color filter R or the green color filter G.

In addition, the backlight unit BLU of FIG. 1 includes a first light source unit LU1 for generating yellow light Ly, a second light source unit LU2 for generating first blue light Lb1, and a third light source unit LU3 for generating second blue light Lb2.

A unit frame 1-Frame is divided into first and second sub-fields 1-Field and 2-Field according to a temporal order.

The first light source unit LU1 is driven in an interval of the first sub-field 1-Field and thus, the yellow light Ly is outputted from the backlight unit BLU and is provided to the display panel PNL.

In addition, at least one of the second light source unit LU2 and the third light source unit LU3 is driven in an interval of the second sub-field 2-Field and thus, at least one of the first blue light Lb1 and the second blue light Lb2 is outputted from the backlight unit BLU and is provided to the display panel PNL.

During an interval of the first sub-field 1-Field, a red light component in the yellow light Ly generated from the backlight unit BLU penetrates the first color filter R and is displayed as a red image, and a green light component in the yellow light Ly penetrates the second color filter G and is displayed as a green image.

During an interval of the second sub-field 2-Field, the first blue light Lb1 and the second blue light Lb2 generated from the backlight unit BLU pass through the first and second open parts W1 and W2 and are displayed as a blue image.

Thus, the first and second open parts W1 and W2 are provided for a space where a blue image is displayed during an interval of the second sub-field 2-Field. In addition, the first and second open parts W1 and W2 may eliminate a color separation phenomenon that may occur from a time division type and may increase brightness, and a size of each of the first and second open parts W1 and W2 may be determined to provide an appropriate transmittance in consideration of a desired brightness or color of a frame.

Figure 9A:
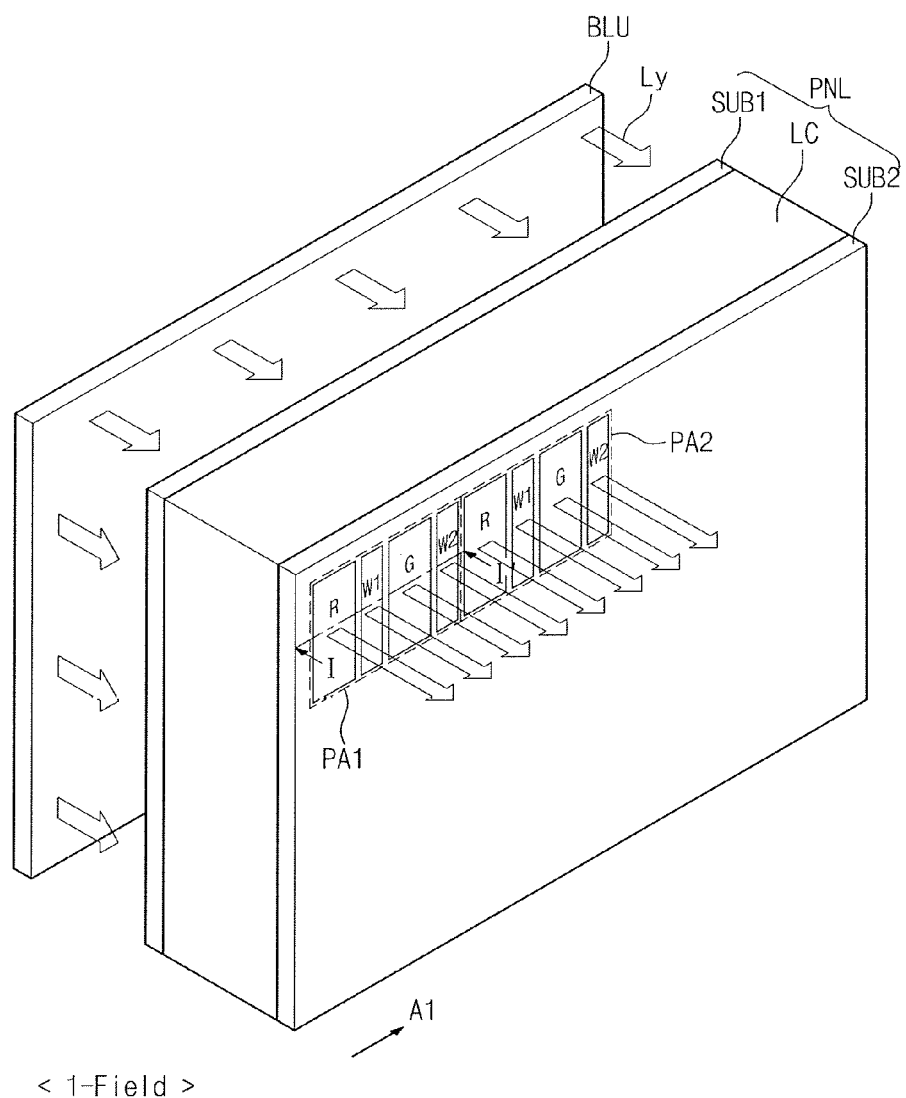
FIGS. 9A and 9B are perspective views illustrating a full color implementation principle by a time/space division type in the display device of FIG. 8.
Figure 9B:
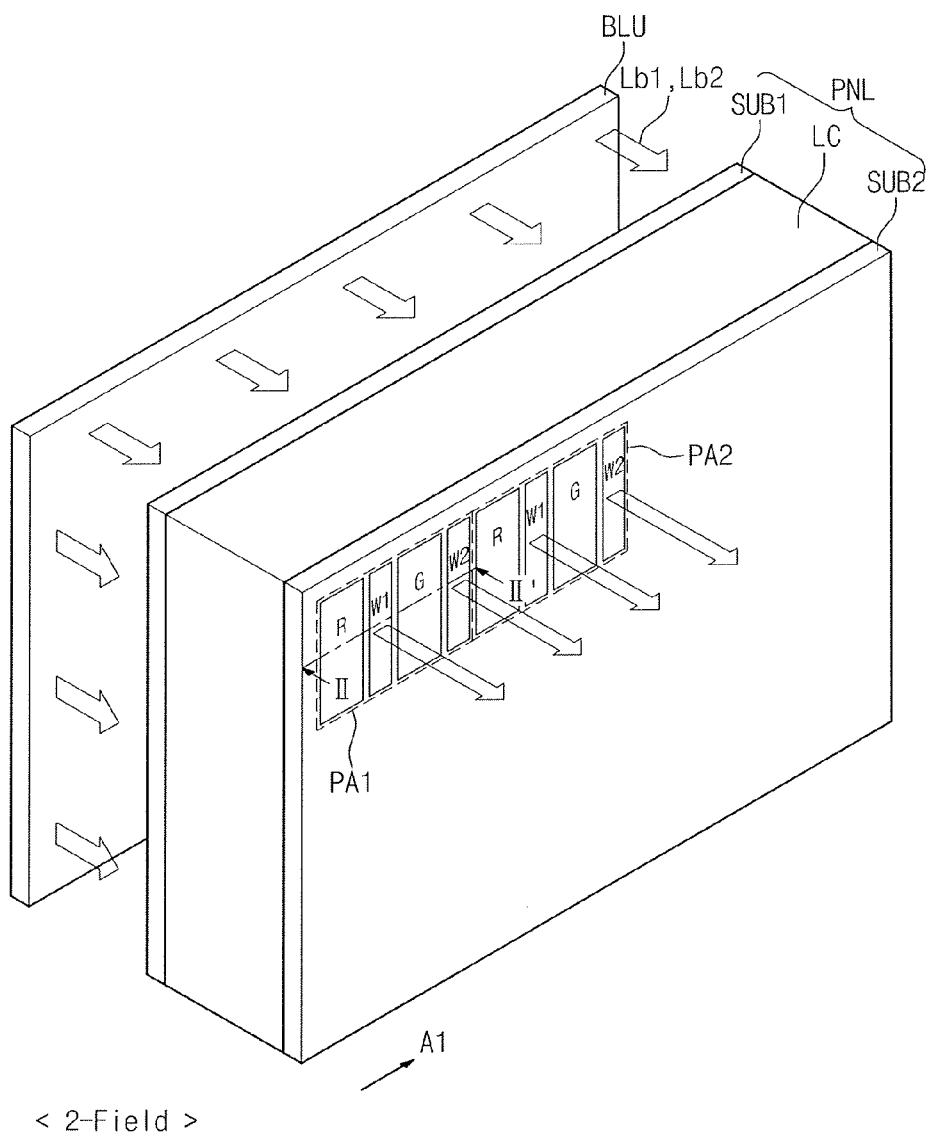
Figure 10A:
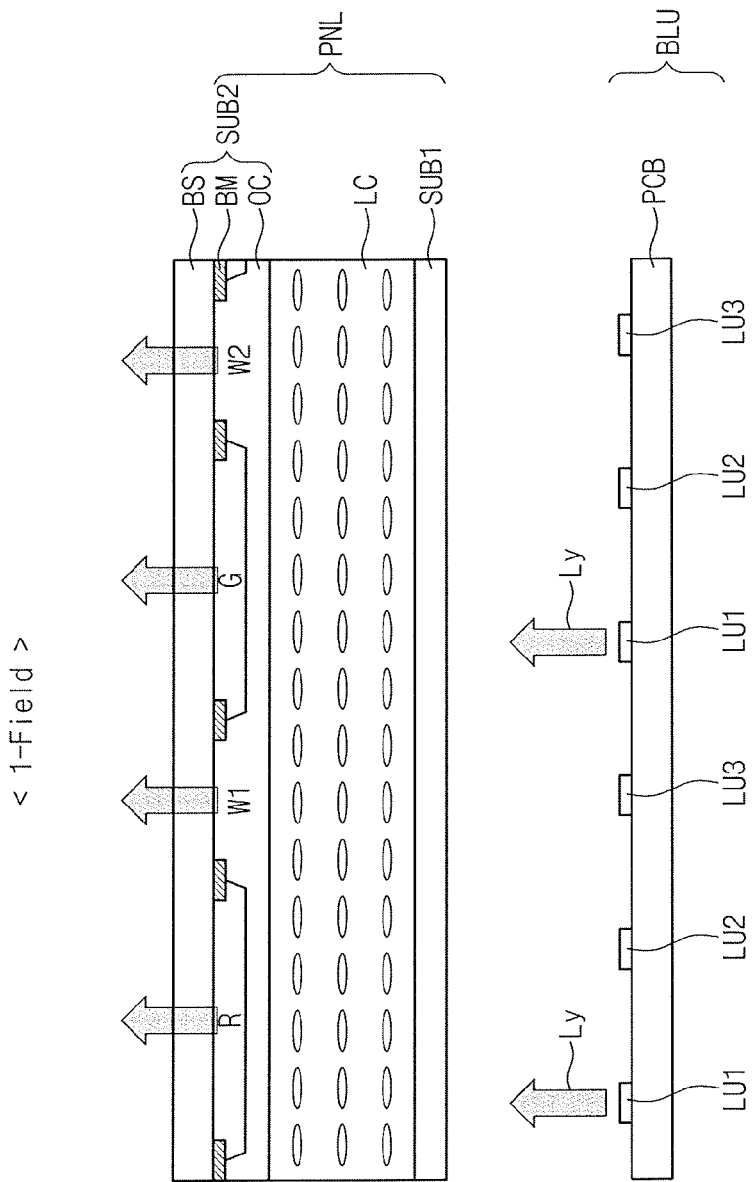
FIG. 10A is a sectional view taken along a line I-I' of FIG. 9A
Figure 10B:
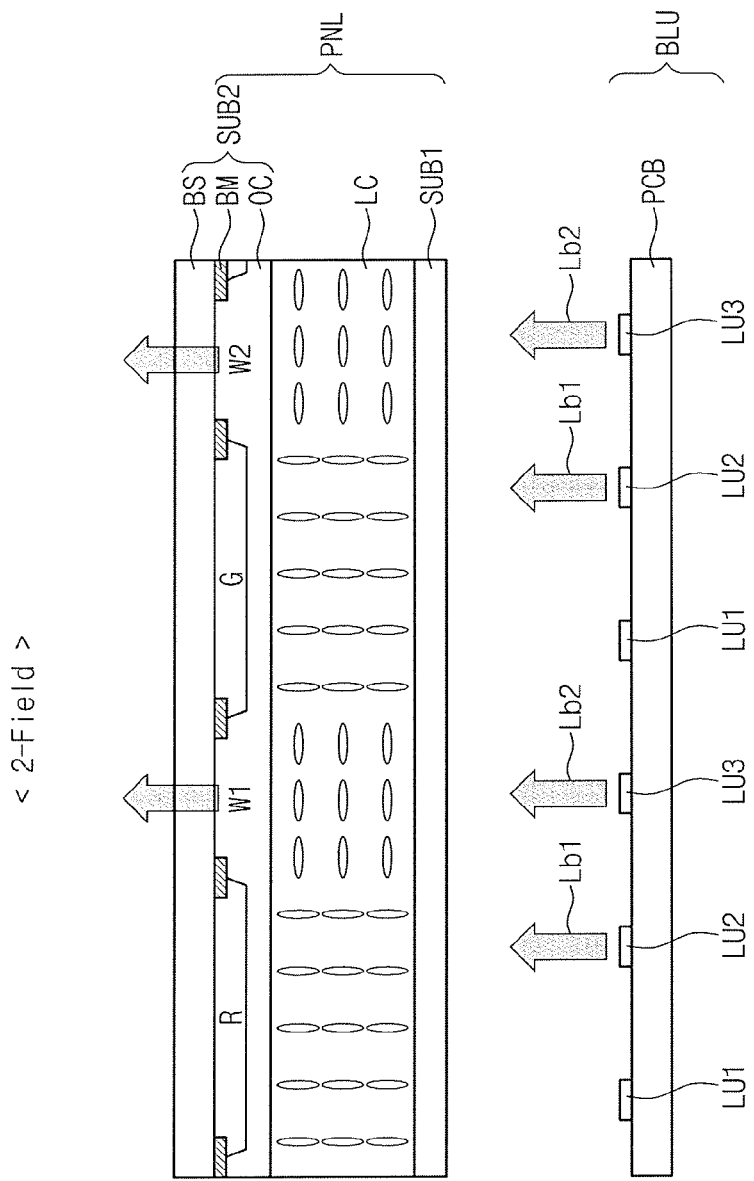
FIG. 10B is a sectional view taken along a line II-II' of FIG. 9B.

FIGS. 9A and 9B are perspective views illustrating a full color implementation principle by a time/space division type in the display device of FIG. 8. FIG. 10A is a sectional view taken along a line I-I' of FIG. 9A and FIG. 10B is a sectional view taken along a line II-II' of FIG. 9B. In addition, FIGS. 9A and 10A illustrate an operation mode of a first sub-field in a unit frame and FIGS. 9B and 10B illustrate an operation mode of a second sub-field in a unit frame.

Referring to FIGS. 9A and 10A, a first pixel area PA1 includes the red and green color filters R and G are spaced apart at a predetermined interval from each other by the first open part W1 in the first direction A1 and thus, the red and green color filters R and G do not overlap each other. In addition, the second open part W2 is arranged between the green color filter G in the first pixel area PA1 and a red color filter of a second pixel area PA2 adjacent to the first pixel area PA1 in the first direction A1. Thus, since the color filters (e.g., red color filter R and green color filter G) are spaced apart from each other by the first open part W1 or the second open part W2, the color filters overlap might not overlap each other. Thus, a liquid crystal spread phenomenon occurring in an overlapping portion may be prevented.

The over coating layer OC is formed of an organic insulating layer and covers the red and green color filters R and G and the first and second open parts W1 and W2, and thus a space between an area where the color filter is formed and an area where the first or second open part W1 or W2 is formed may be planarized. As seen on a plane, each area of the first and second open parts W1 and W2 may be equal to or less than each area of the red and green color filters R and G. In addition, as seen on a plane, each width of the first and second open parts W1 and W2 in the first direction A1 may be less than each width of the red and green color filters R and G in the first direction A1.

During an interval of the first sub-field 1-Field, the first light source unit LU1 operates to output the yellow light Ly, and the second light source unit LU2 and the third light source unit LU3 are turned off.

During an interval of the first sub-field 1-Field, the red, green, and white sub pixels all operate. Accordingly, the yellow light Ly outputted from the first light source unit LU1 passes through the red and green color filters R and G and the first and second open parts W1 and W2, and is displayed as an image.

Referring to FIGS. 9B and 10B, during an interval of the second sub-field 2-Field, the first light source unit LU1 is turned off, and the second light source unit LU2 and the third light source unit LU3 operate to output the first blue light Lb1 and the second blue light Lb2.

In addition, during an interval of the second sub-field 2-Field, the red and green sub pixels do not operate, and the white sub pixel operates. Accordingly, the first blue light Lb1 and the second blue light Lb2 outputted, respectively from the second light source unit LU2 and the third light source unit LU3 do not pass through the red and green color filters R and G and pass through the first and second open parts W1 and W2, and are displayed as a blue image.

Figure 11:
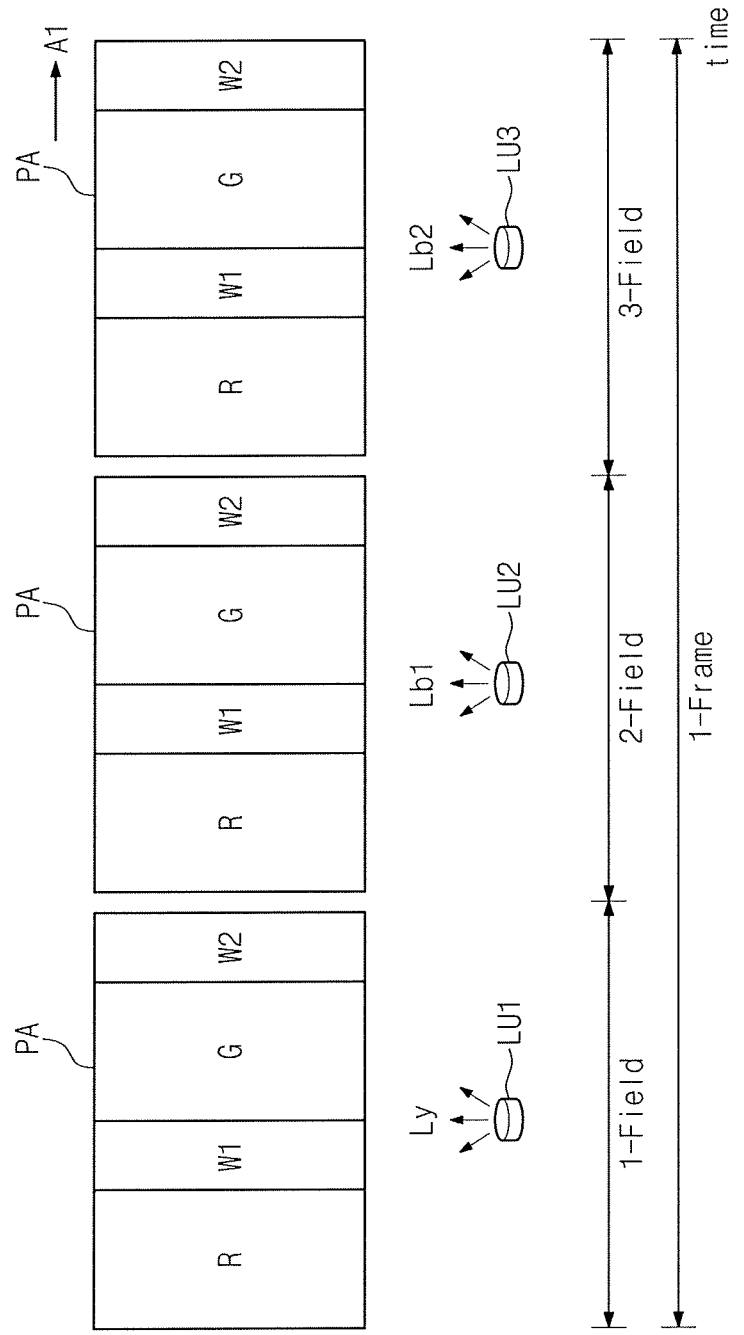
FIG. 11 is a conceptual diagram illustrating a full color implementation principle by a time/space division type according to an embodiment of the present inventive concept.

According to an embodiment of the present inventive concept, the first light source unit LU1 and the second light source unit LU2 may be separately driven in different sub-field intervals. FIG. 11 is a diagram illustrating a full color implementation principle by a time/space division type according to an embodiment of the present inventive concept.

Referring to FIG. 11, when an area corresponding to one pixel is defined as a pixel area PA, each pixel area PA includes the red and green color filters R and G. In addition, the first and second open parts W1 and W2 are formed in each pixel area PA. The first open part W1 is formed between the red and green color filters R and G, and the second open part W2 is formed at one side of either the red color filter R or the green color filter G.

In addition, the backlight unit BLU of FIG. 1 includes a first light source unit LU1 for generating yellow light Ly, a second light source unit LU2 for generating first blue light Lb1, and a third light source unit LU3 for generating second blue light Lb2.

A unit frame 1-Frame is divided into first to third sub-fields 1-Field, 2-Field, and 3-Field according to a temporal order. The first light source unit LU1 is driven in an interval of the first sub-field 1-Field and thus, the yellow light Ly is outputted from the backlight unit BLU and is provided to the display panel PNL. The first light source unit LU1 is driven in an interval of the second sub-field 2-Field and thus, the first blue light Lb1 is outputted from the backlight unit BLU and is provided to the display panel PNL. The third light source unit LU3 is driven in an interval of the third sub-field 3-Field and thus, the second blue light Lb2 is outputted from the backlight unit BLU and is provided to the display panel PNL.

Figure 12A:
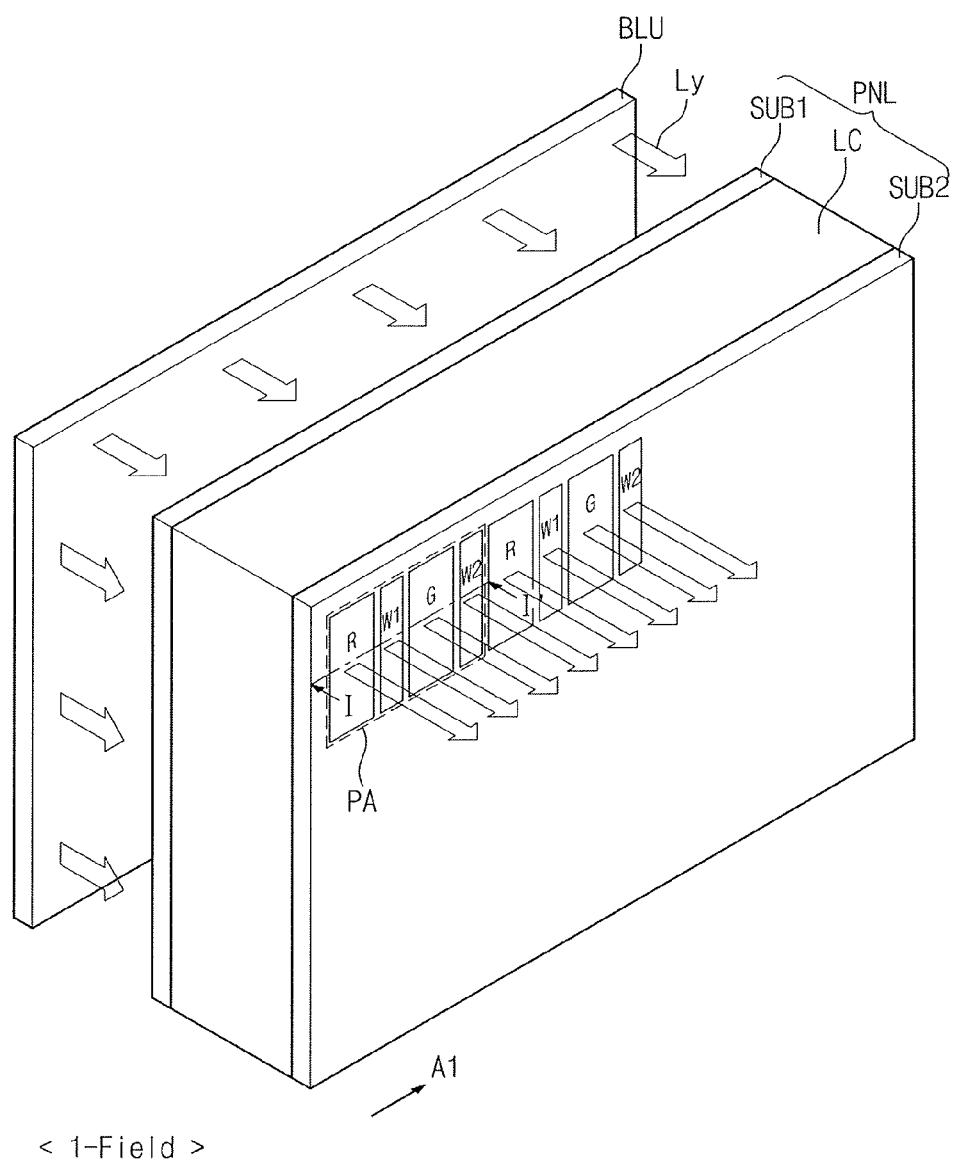
FIGS. 12A, 12B, and 12C are perspective views illustrating a full color implementation principle by a time/space division type in the display device of FIG. 11.
Figure 12B:
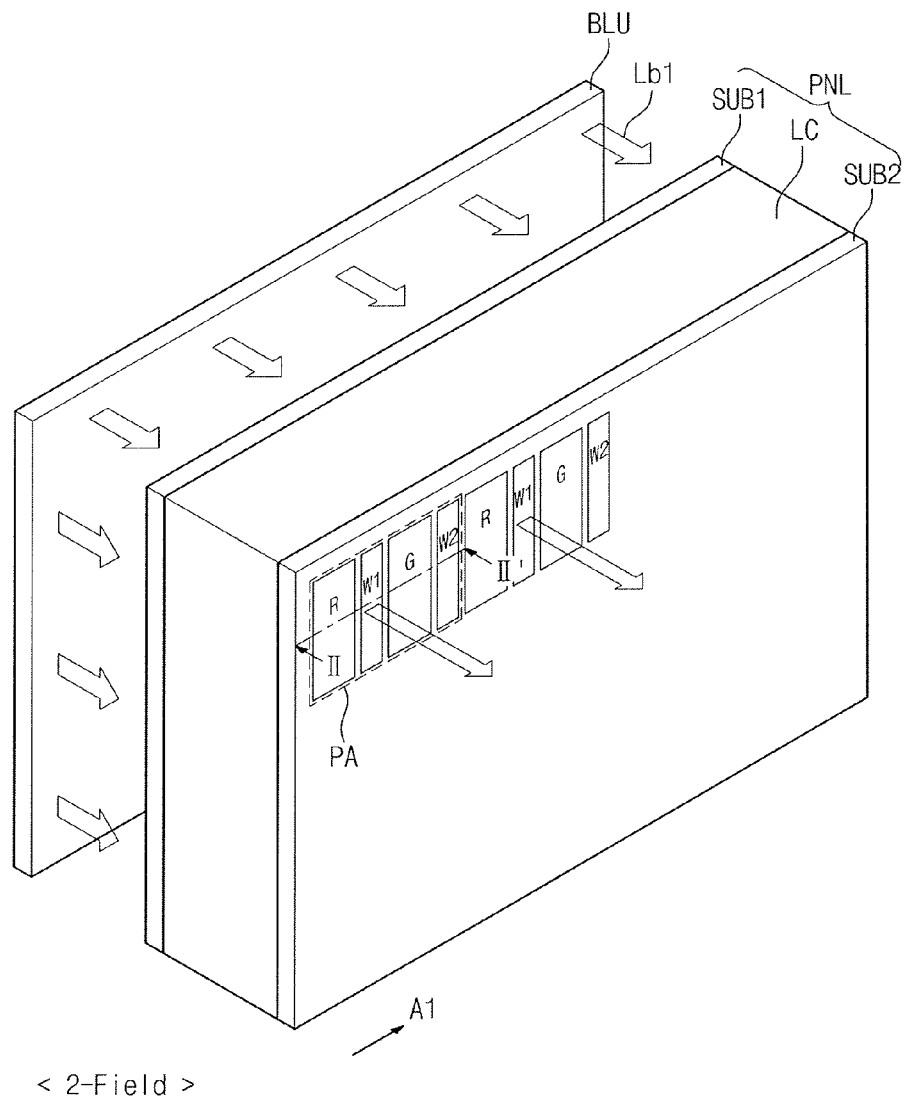
Figure 12C:
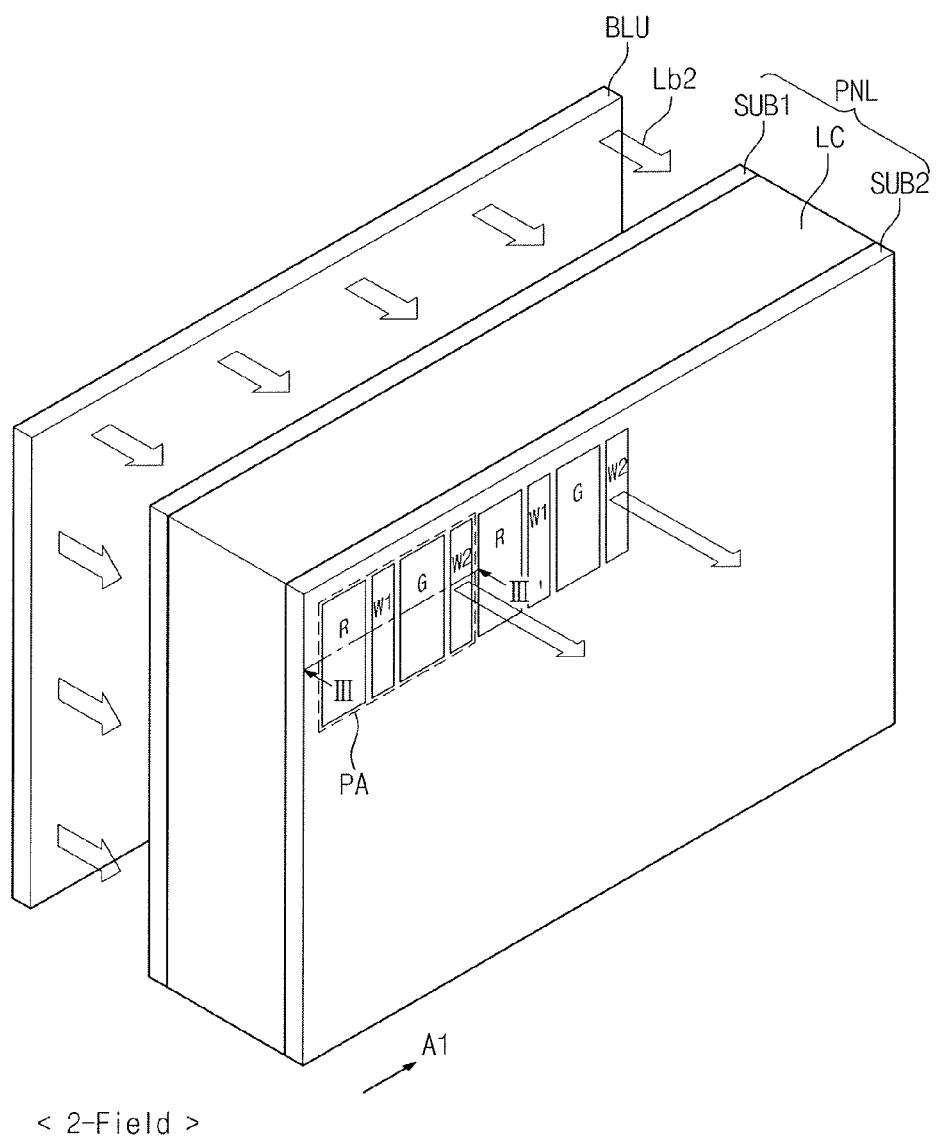
Figure 13A:
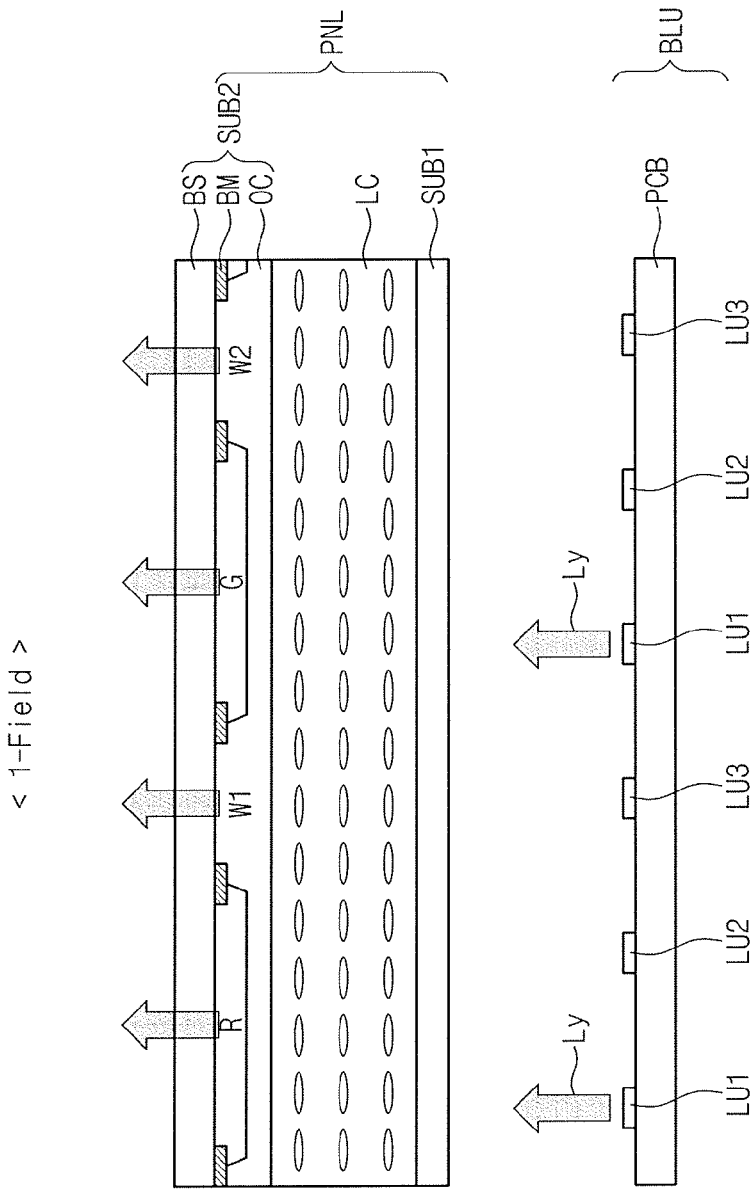
FIG. 13A is a sectional view taken along a line I-I' of FIG. 12A.
Figure 13B:
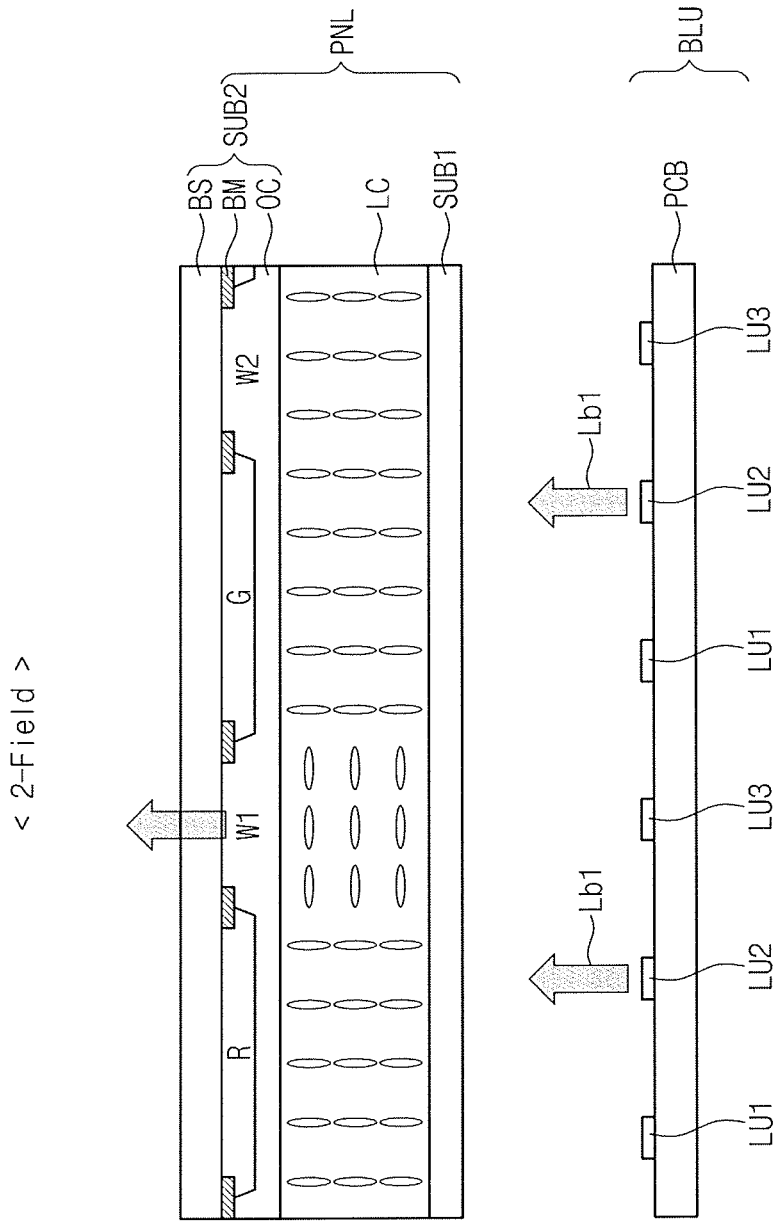
FIG. 13B is a sectional view taken along a line II-II' of FIG. 12B.
Figure 13C:
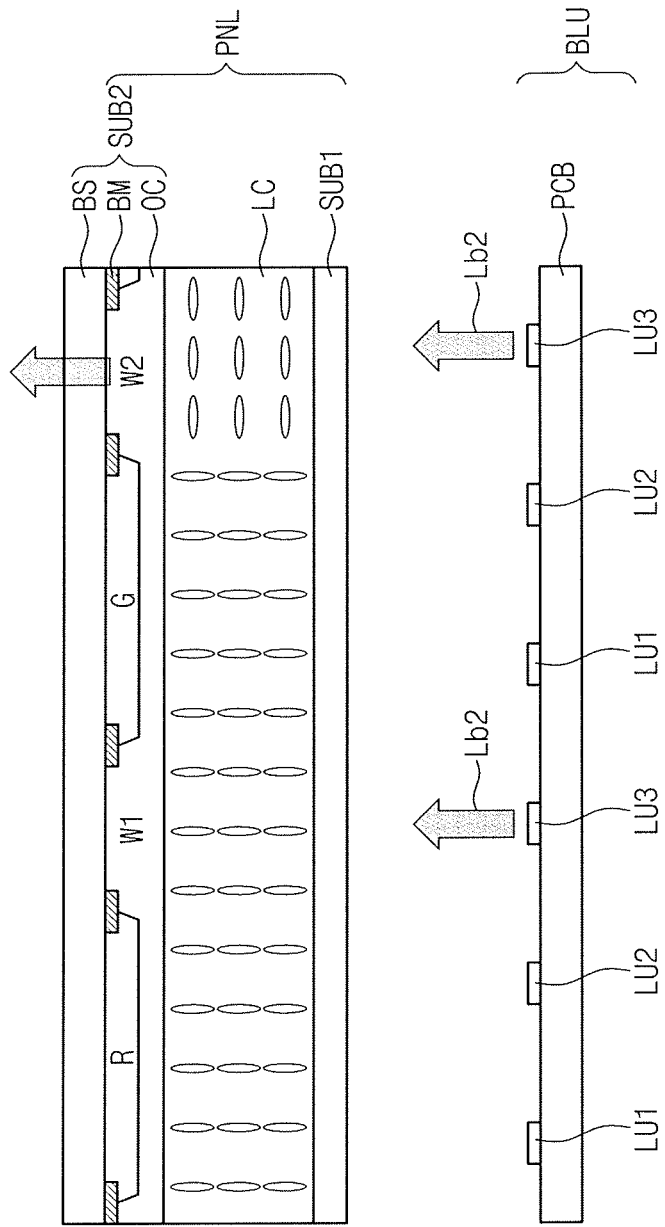
FIG. 13C is a sectional view taken along a line III-III' of FIG. 12C.

FIGS. 12A, 12B, and 12C are perspective views illustrating a full color implementation principle by a time/space division type in the display device of FIG. 11. FIG. 13A is a sectional view taken along a line I-I' of FIG. 12A and FIG. 13B is a sectional view taken along a line II-II' of FIG. 12B. FIG. 13C is a sectional view taken along a line III-III' of FIG. 12C. In addition, FIGS. 12A and 13A illustrate an operation mode of a first sub-field in a unit frame and FIGS. 12B and 13B illustrate an operation mode of a second sub-field in a unit frame. 12C and 13C illustrate an operation mode of a third sub-field in a unit frame.

Referring to FIGS. 12A and 13A, during an interval of the first sub-field 1-Field, the first light source unit LU1 operates to output the yellow light Ly, and the second light source unit LU2 and the third light source unit LU3 are turned off. Accordingly, the yellow light Ly outputted from the first light source unit LU1 passes through the red and green color filters R and G and the first and second open parts W1 and W2, and is displayed as an image. Here, the red sub pixel, the green sub pixel, and the first and second white sub pixels are separately driven and thus, a red image, a green image, or a yellow image may be realized according to whether each sub pixel (e.g., red sub pixel, green sub pixel, first white sub pixel, or second white sub pixel) operates.

Referring to FIGS. 12B and 13B, during an interval of the second sub-field 2-Field, the second light source unit LU2 operates to output the first blue light Lb1, and the first light source unit LU1 and the third light source unit LU3 are turned off.

During an interval of the second sub-field 2-Field, the red and green sub pixels and the second white sub pixel do not operate, and the first white sub pixel operates. Accordingly, the first blue light Lb1 outputted from the second light source unit LU2 do not pass through the red and green color filters R and G and the second open part W2, and passes through only the first open part W1. Thus the first blue light Lb1 is displayed as a blue image in a first wavelength band.

Referring to FIGS. 12C and 13C, during an interval of the third sub-field 3-Field, the third light source unit LU3 operates to output the second blue light Lb2, and the first light source unit LU1 and the second light source unit LU2 are turned off.

During an interval of the third sub-field 3-Field, the red and green sub pixels and the first white sub pixel do not operate, and the second white sub pixel operates. Accordingly, the second blue light Lb2 outputted from the third light source unit LU3 do not pass through the red and green color filters R and G and the first open part W1, and passes through only the second open part W2. Thus, the second blue light Lb2 is displayed as a blue image in a second wavelength band.

For example, a wavelength of blue light may be less than about 430 nm.

The above-disclosed subject matter is to be considered illustrative and not restrictive. Although the present inventive concept has been described with reference to exemplary embodiments thereof, it will be understood that various modifications in form and details may be made therein without departing from the spirit and scope of the present inventive concept. Thus, the present inventive concept shall not be limited to the disclosed embodiments.

What is claimed is:

1. A display device comprising:
a display panel including a plurality of pixels; and
first to third light source units each disposed on a rear surface of the display panel,
wherein the first light source unit is configured to emit yellow light, the second light source unit is configured to emit a first blue light in a first wavelength band, and the third light source unit is configured to emit a second blue light in a second wavelength band,
wherein the second wavelength band includes light of a longer wavelength than light of the first wavelength band, and
wherein the first wavelength band ranges from about 430 nm to about 455 nm, and the second wavelength band ranges from about 460 nm to about 505 nm.

2. The display device of claim 1, wherein a first pixel of the plurality of pixels comprises a first color filter, a second color filter having a different color from that of the first color filter, and an open part where neither the first color filter nor the second color filter is formed.

3. The display device of claim 2, wherein the first and second color filters are adjacent to each other in a first direction, and the open part is adjacent to one of the first and second color filters in the first direction.

4. The display device of claim 2, wherein the first color filter and the second color filter are spaced apart from each other in a first direction, and
the open part comprises a first open part arranged between the first and second color filters in the first direction and a second open part arranged between the first pixel and a second pixel adjacent to the first pixel in the first direction among the plurality of pixels.

5. The display device of claim 4, wherein a width of each of the first and second open parts is less than a width of each of the first and second color filters.

6. The display device of claim 4, wherein the display panel is configured to display an image of a frame including first to third sub-fields,
wherein the first light source unit is turned on and the second and third light source units are turned off during the first sub-field,
the second light source unit is turned on and the first and third light source units are turned off during the second sub-field, and
the third light source unit is turned on and the first and second light source units are turned off during the third sub-field.

7. The display device of claim 6, wherein the yellow light passes through the first color filter, the second color filter, the first open part, and the second open part during the first sub-field,
the first blue light passes through the first open part and does not pass through the first color filter, the second color filter, and the second open part during the second sub-field, and
the second blue light passes through the second open part and does not pass through the first color filter, the second color filter, and the first open part during the third sub-field.

8. The display device of claim 2, wherein the first and second color filters are a red color filter and a green color filter, respectively.

9. The display device of claim 2, wherein the display panel is configured to display an image in a frame including a first sub-field and a second sub-field,
wherein the first light source unit is turned on and the second and third light source units are turned off during the first sub-field, and at least one of the second light source unit and the third light source unit is turned on and the first light source unit is turned off during the second sub-field.

10. The display device of claim 9, wherein the second light source unit and the third light source unit are driven individually.

11. The display device of claim 10, wherein the second light source unit and the third light source unit are alternately driven for each frame.

12. The display device of claim 9, wherein
the yellow light passes through the first color filter, the second color filter, and the open part during the first sub-field, and
at least one of the first blue light and the second blue light passes through the open part and does not pass through the first color filter and the second color filter during the second sub-field.

13. The display device of claim 1, wherein the yellow light comprises a red color light component and a green color light component.

14. The display device of claim 13, wherein the first pixel comprises first, second, and third sub pixels corresponding to the first color filter, the second color filter, and the open part, respectively, and
the first to third sub pixels are driven separately.

15. The display device of claim 14, wherein
the first to third sub pixels are turned on during the first sub-field, and
the third sub pixel is turned on and the first and second sub pixels are turned off during the second sub-field.

16. The display device of claim 1, wherein an intensity of the first blue light of the second light source unit and an intensity of the second blue light of the third light source unit are different from each other in a frame.

* * * * *